(12) United States Patent
Staley

(10) Patent No.: US 7,146,934 B1
(45) Date of Patent: Dec. 12, 2006

(54) MUSHROOM-SHAPED PET CHEW TOY SCENT TRAINING DEVICE AND METHOD OF TRAINING THEREWITH

(76) Inventor: Stacy Staley, 324 Eureka Ave., Fairbanks, AK (US) 99701

( * ) Notice: Subject to any disclaimer, the term of this patent is extended or adjusted under 35 U.S.C. 154(b) by 23 days.

(21) Appl. No.: 11/191,102

(22) Filed: Jul. 27, 2005

Related U.S. Application Data

(60) Provisional application No. 60/605,690, filed on Aug. 31, 2004.

(51) Int. Cl.
*A01K 15/02* (2006.01)

(52) U.S. Cl. ...................................... 119/709; 119/711

(58) Field of Classification Search ................ 119/711, 119/702, 707, 709, 710, 905; 239/34; D23/366, D23/367, 369; D30/160
See application file for complete search history.

(56) References Cited

U.S. PATENT DOCUMENTS

| | | | | |
|---|---|---|---|---|
| 1,006,182 | A * | 10/1911 | Cousin | 119/711 |
| 1,022,112 | A * | 4/1912 | Smith | 119/711 |
| 1,729,389 | A * | 9/1929 | Hughette | 43/131 |
| 1,780,408 | A * | 11/1930 | Smith | 239/36 |
| 2,025,657 | A * | 12/1935 | Ganz | 239/55 |
| 2,086,631 | A * | 7/1937 | Munro | 119/711 |
| 2,215,988 | A * | 9/1940 | Vivaudou et al. | 239/55 |
| 3,706,140 | A * | 12/1972 | Brillaud et al. | 34/60 |
| 4,194,690 | A * | 3/1980 | Stever et al. | 239/57 |
| D275,121 | S * | 8/1984 | Osborne | D21/507 |
| 4,532,722 | A * | 8/1985 | Sax | 34/60 |
| D286,675 | S * | 11/1986 | Hoyt | D23/366 |
| 4,808,347 | A * | 2/1989 | Dawn | 261/30 |
| 4,909,438 | A * | 3/1990 | Viti | 239/34 |
| 5,121,881 | A * | 6/1992 | Lembeck | 239/44 |
| D338,263 | S * | 8/1993 | Davies | D23/367 |
| 5,259,555 | A * | 11/1993 | Kiefer | 239/35 |
| 5,865,147 | A * | 2/1999 | Rubin | 119/711 |
| 6,029,900 | A * | 2/2000 | Quinones | 239/47 |
| 6,039,266 | A * | 3/2000 | Santini | 239/60 |
| D478,973 | S * | 8/2003 | Wagner | D23/367 |
| 6,631,852 | B1 * | 10/2003 | O'Leary | 239/60 |
| 6,843,158 | B1 * | 1/2005 | Garcia et al. | 89/1.13 |
| 6,880,765 | B1 * | 4/2005 | Tuomikoski et al. | 239/34 |
| 6,899,059 | B1 * | 5/2005 | Crane et al. | 119/711 |
| 6,913,733 | B1 * | 7/2005 | Hardy et al. | 422/124 |
| 6,945,195 | B1 * | 9/2005 | Morrison | 119/707 |
| 2005/0039698 | A1 * | 2/2005 | Pope | 119/711 |

* cited by examiner

Primary Examiner—Yvonne R. Abbott
(74) Attorney, Agent, or Firm—Michael J. Tavella

(57) ABSTRACT

A synthetic pet chew toy and scent-training aid, resembling desired mushroom species, that is formed of nontoxic, elastomeric materials, and a method for training one or more dogs to detect desirable fungi species, terrestrial or subterranean, using the toy as a scent-training aid. The toy can be formed with a hollow interior and with a plurality of small holes opening in the top and/or sides of the toy to form channels for scent dispersal to the ambient air. A threaded, opening at the base of the toy, into which a removable, threaded plug can be inserted, allows the hollow chamber to be filled with dried mushrooms, fresh mushrooms, or sponge/foam/cotton fiber soaked in mushroom extract, for use as a dog scent-training aid to locate wild-growing fungi. The pet chew toy can be filled with food treats or catnip for scent-related games like "hide and seek", or bells for auditory enticement.

13 Claims, 5 Drawing Sheets

MUSHROOM-SHAPED PET CHEW TOY SCENT TRAINING DEVICE AND METHOD OF TRAINING THEREWITH

CROSS REFERENCE TO RELATED APPLICATIONS

This application claims priority of Provisional Patent Application No. 60/605,690, filed Aug. 31, 2004

STATEMENT REGARDING FEDERALLY SPONSORED RESEARCH AND DEVELOPMENT

Not Applicable

BACKGROUND OF THE INVENTION

1. Field of the Invention

The invention relates generally to dog scent-training devices and chew toys for pets and more particularly to a scent-filled device intended for training a dog to locate specific species of edible, medicinal or other desired fungi species.

2. Description of the Prior Art

It is known that dogs in particular have an acute sense of smell and, consequently, dogs have been used to perform various forms of scent-based detection work, including search and rescue of missing or injured persons, narcotic and drug detection by the police and federal authorities, accelerant detection in possible arson matters, and incendiary device detection for bomb threats. Trained truffle hounds, used to located subterranean fungi, are a long-standing European tradition. Scent-related games of the "hide-and-seek" variety are becoming part of a new repertoire of owner and pet interactions.

As the interest in fungi as sources of food, medicine and natural dyes continues to grow in the United States, more people will become involved in locating and collecting wild fungi. A dog has an average of between twenty-five and forty times the number of olfactory cells compared to that of humans, this increased sensory ability allows a trained dog to detect particular species of mushrooms very efficiently. A dog trained in fungi detection increases the chance of successful mushroom collecting and provides an enjoyable way for owners and pets to interact.

Moreover, scent-related games that utilize the canine talent for scent location and discrimination are becoming more popular with the average dog owner and less exclusively the purview of the professional trainer or obedience competitor. "Hide-and-seek" and "which hand is it in?" are examples of scent games anyone can enjoy with their pet. Scent can also be used to create enthusiasm for a dog learning to retrieve.

Many highly desired edible and medicinal mushroom species are not available commercially, or only available at high cost. Due to many fungi's unique symbiotic relationships with other living plants and trees, they cannot presently be cultivated; the only way to possess some mushrooms is to collect them from the wild. Species sought after in Europe and North America include: *Boletus edulis* (Cep), *Morchella esculenta* (Morel), *Agaricus augustus* (Prince), *Armillaria ponderosa* (Matsutake), *Cantharellus cibarius* (Chanterelle), *Dentinum repandum* (Hedgehog), *Coprinus comatus* (Shaggy Mane), *Amanita caesarea* (Caesar's Amanita), *Pleurotus ostreatus* (Oyster), *Lactarius deliciosus* (Milkcap), *Lepista nuda* (Blewit), *Sparasis crispa* (Cauliflower), *Grifola frondosa* (Maitake), and Tuberales (Truffles).

At this time, the prior art is not concerned directly with training dogs to locate, by scent and sight, desired mushroom species, terrestrial or subterranean. No training aid or toy allows a dog to associate a size and form with the appropriate scent as the target of a fungal search. However, prior art does include examples of scent related dog training devices and methods. Prior art also includes toys scented by various means to increase their desirability to pets. Some examples of these are found in the following U.S. patents.

U.S. Pat. No. 6,425,350 discloses a method and apparatus for training and using dogs in the detection of fungi and bacterial contaminants to inexpensively recognize sites in need of decontamination.

U.S. Pat. No. 6,531,145 discloses silica gel beads that conveniently release scent. One embodiment of the invention is to train dogs to hunt using scent.

A number of chew toys have been disclosed that contain a scent component in their manufacture to make them more attractive to carnivores, especially dogs. One example is U.S. Pat. No. 6,415,741, a scented chew toy that allows the scented material to be inserted within the body of the chew toy during manufacture. The scent is released through channels in outer frame of the toy, at the same time preventing the scented material from coming off on the hands when handled.

Chewable pet toys, especially toys with irregular surfaces, provide benefits to pets, such as masticatory exercise and dental prophylaxis. Irregular shapes give erratic movements to toys and provide stimulation and exercise to pets. Scents, particularly food scents, are sensory attractants and increase an animal's interest in the toy. Hollow chew toys that can be filled with treats (dog biscuits, kibble, canned dog food, jerky treats etc.) to retain an animal's interest for a longer period of time while they try to dislodge the treats have also been disclosed, such as U.S. Pat. No. 6,439,166. Toys designed to hold catnip, such as U.S. Pat. No. 5,682,838, use scents as a stimulant and play enticement for feline pets.

A pet toy that can be used in conjunction with a scent-training method designed specifically for the detection of desired fungi has yet to be developed. A multipurpose toy that also provides chewing exercise, treat dispensing, scent (i.e. food treats, catnip) and sound (bells) enticements that will engage and maintain the play interest of a pet would benefit a pet owner as well as their canine or feline companion.

BRIEF DESCRIPTION OF THE INVENTION

The instant invention is a synthetic, hollow, mushroom-shaped pet chew toy and canine scent-training aid designed to hold a replaceable sensory attractant. The toy in its preferred form is composed of a non-toxic resilient flexible material, such as natural rubber, vinyl or latex, which prevents it from being destroyed when chewed on by the animal. It is also contemplated within the spirit and scope of this invention that the degree of resiliency of the material making up the mushroom-shaped chew toy can be varied to achieve the desired results. The toy has a hollow core, providing a cavity for flavor or scent impregnated material (i.e. animal food treats, catnip, dried or fresh mushroom pieces, or mushroom extract soaked on a sponge/foam/cotton fiber) that is located within the interior of the toy. A plurality of small holes or channels formed in the toy body allows scent emission to the ambient air. An alternative is to fill the cavity with one or more bells to provide auditory enticement.

The preferred embodiment of the invention has an essentially hemispheric top half and an essentially cylindrically shaped base, generally resembling stylized versions of various mushroom species. A cylindrical, threaded opening at the base of the stem of the toy receives a plug to hold the scented content securely inside. The plug is formed of a solid, threaded piece of material designed to screw into the opening in the base of the stem. The bottom surface of the plug includes a groove, allowing a coin or screwdriver to insert or remove the plug. The use of the plug is optional and is not used if the toy is filled with treats that are intended to be removed by the pet during play.

Accordingly, it is an object of the invention to provide a toy in numerous colors and textured surfaces, as desired. For example, colors used may resemble mushroom species; other colors mimicking natural coloration of desired mushroom species, while some colors are bright, primary, fluorescent, or glow-in-the-dark, to aid location in the field (by canine trainers) during field training exercises.

It is another object of the invention to provide a training aid for the scent discrimination, object identification, and location of various fungi species, terrestrial or subterranean, by dogs.

It is yet another object of the invention to provide an improved chew toy for pets, such as dogs and cats.

It is a further object of this invention to provide a chew toy for pets that has high durability.

It is another object of this invention to provide an animal toy that a dog or cat may carry easily in its mouth.

It is yet another object of the invention to provide an animal toy that a dog or cat may easily pick up off of the ground.

It is yet another object of the invention is to provide an animal toy that can be used to teach a dog to fetch.

It is yet a further object of the invention that has an elastomeric material, such as natural rubber, vinyl or latex, the resilient nature of which, also provides the toy with the ability to bounce as a pet plays with the toy to keep the pet's interest and thus insure that the pet plays with the toy for longer periods.

It is another object of the invention to provide an animal toy that can be used in a variety of scent-related games, such as, "hide-and-seek".

An alternative embodiment of the invention includes a smaller toy, suited to a feline's smaller size, where catnip (or valerian or a mixture of herbs cats find attractive) or a food treat are placed in the hollow core of the mushroom-shaped pet toy with the plug inserted. The scent of catnip emanating from the plurality of small holes, or channels, in the toy's body provides a strong attraction for the cat and induces the cat to play with the device.

Another alternative embodiment of the invention includes placing one or more small bells within the hollow core of the device as an auditory enticement for pets In another embodiment, extracts of individual desired mushroom species could be produced as scent training aids to be used in conjunction with the toy where fresh or dried mushrooms of the desired species are not readily available. Mushroom extracts can be can be dispensed on foam, sponge, or cotton fiber to be inserted within the hollow body of the toy.

DETAILED DESCRIPTION OF THE INVENTION

Figure 1:
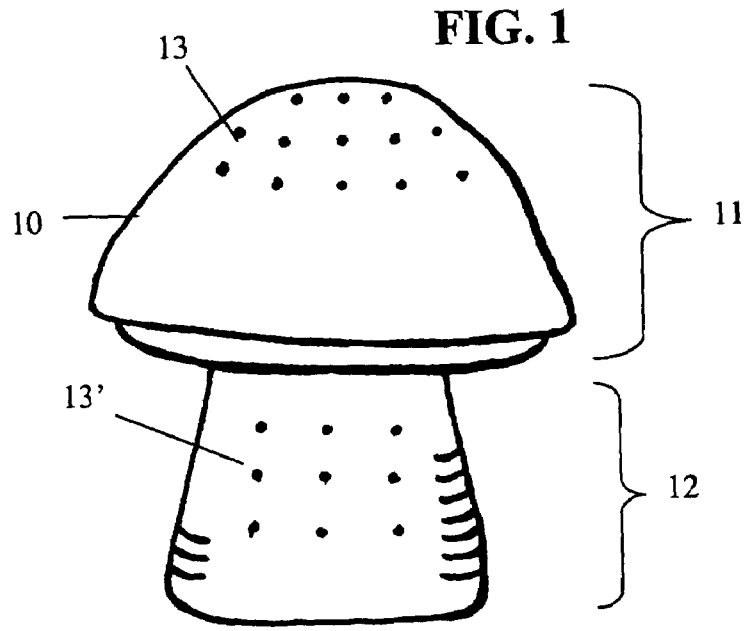
FIG. 1 is a perspective view of a stylized version of *Boletus edulis* commonly known as "Cep", as a mushroom-shaped chew toy and scent-training aid constructed in accordance with the preferred embodiment of the invention.

Referring now to FIG. 1 shows a hollow, mushroom-shaped pet chew toy 10, a stylized version of *Boletus edulis* commonly known as "Cep". The hemispherical top half 11 of the toy contains a plurality of small holes, or channels 13, that allow scent to make fluid contact with the ambient air. The lower cylindrical portion 12 of the toy may also contain a plurality of small holes, or channels 13'.

Figure 2:
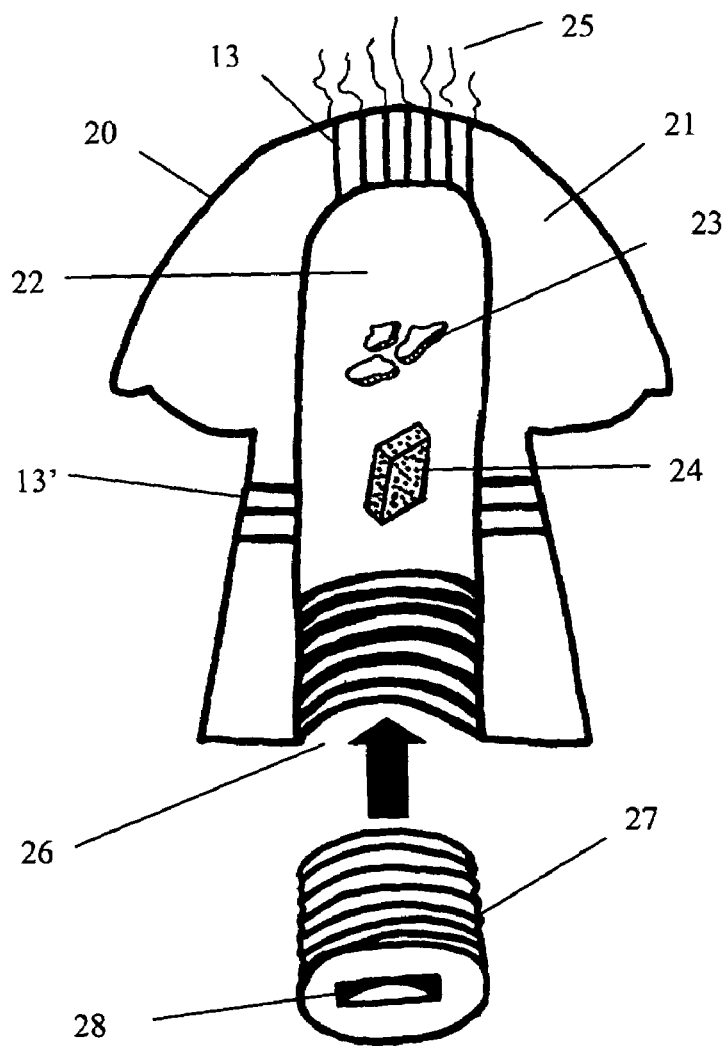
FIG. 2 shows a cross section view of the invention in its preferred embodiment.

FIG. 2 shows a cross section 20 of the preferred embodiment of the invention, showing the toy's hollow interior 22. The outer shell 21 of the toy 10 consists of a non-toxic, resilient flexible material, such as natural rubber, vinyl latex, which prevents it from being destroyed when chewed on by the animal. The hollow core 22 provides a cavity for flavor or scent impregnated material such as dried or fresh mushroom pieces 23, or mushroom extract soaked on a sponge/foam/cotton fiber 24 allowing scent emission 25 to emanate through the plurality of small holes, or channels 13. The bottom of the cylindrical lower half of the device includes a threaded cylindrical opening 26 that is sealed with a solid, threaded cylindrical plug 27. The plug has a groove 28 in its bottom surface to accept a coin or screwdriver to insert or remove the plug.

Figure 3:
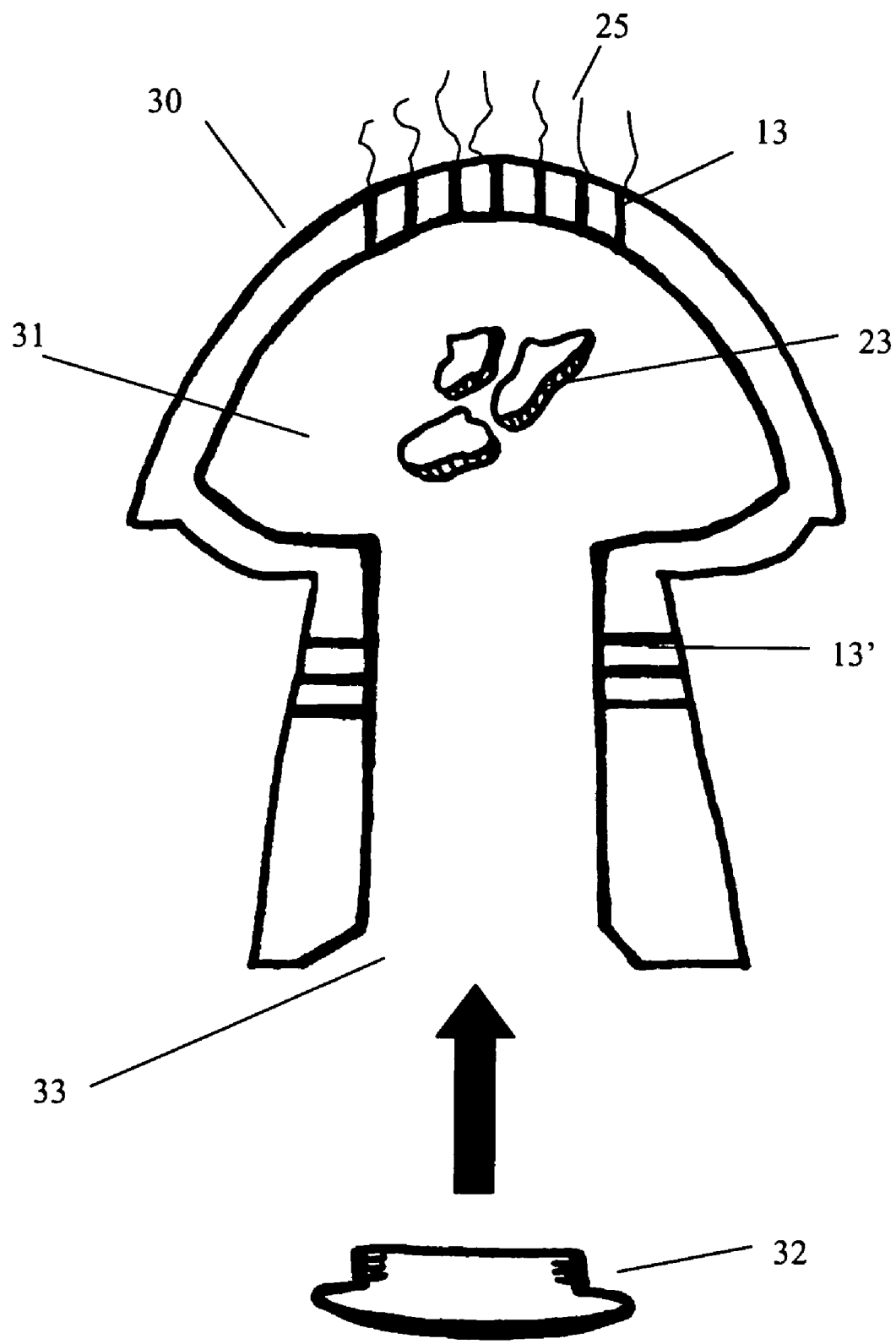
FIG. 3 is a cross-sectional view showing the hollow interior of an alternate design of FIG. 1.

FIG. 3 shows a cross sectional view of an alternative design of the preferred embodiment of the invention. In this embodiment, the toy 30 has a hollow interior 31. The lower portion of the toy is cylindrical. Unlike the previous embodiment, where the plug was screwed into place, this embodiment uses a non-threaded, plug 32 that is inserted into a concave opening 33 at the base of the toy. As before, the hollow interior and removable plug allow the user to insert dried or fresh mushroom pieces 23, or other items into the toy.

Figure 4:
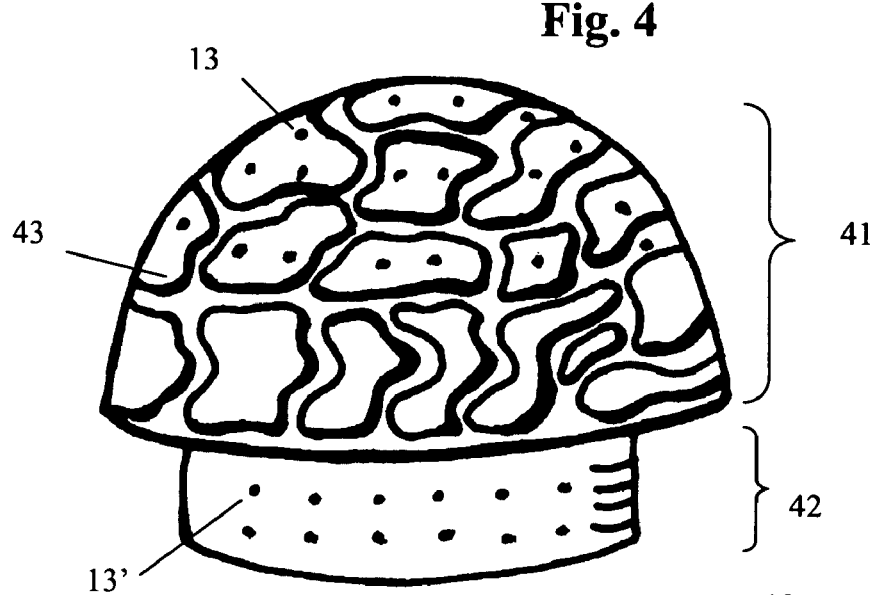
FIG. 4 is a perspective view of an alternate design of the mushroom-shaped chew toy, a stylized version of Tuberales commonly known as "Truffle".

FIG. 4 is a perspective view of another alternate form of the invention. In this embodiment, the hollow, mushroom-shaped pet chew toy 40 is a stylized version of Tuberales commonly known as "Truffle". The irregularly textured hemispherical top half 41 of the toy 40 contains a plurality of small holes, or channels 13, which allow scent to leave the toy and act in fluid contact with the ambient air. The lower, cylindrical portion 42 of the toy may also contain a plurality of small holes, or channels 13'.

Figure 5:
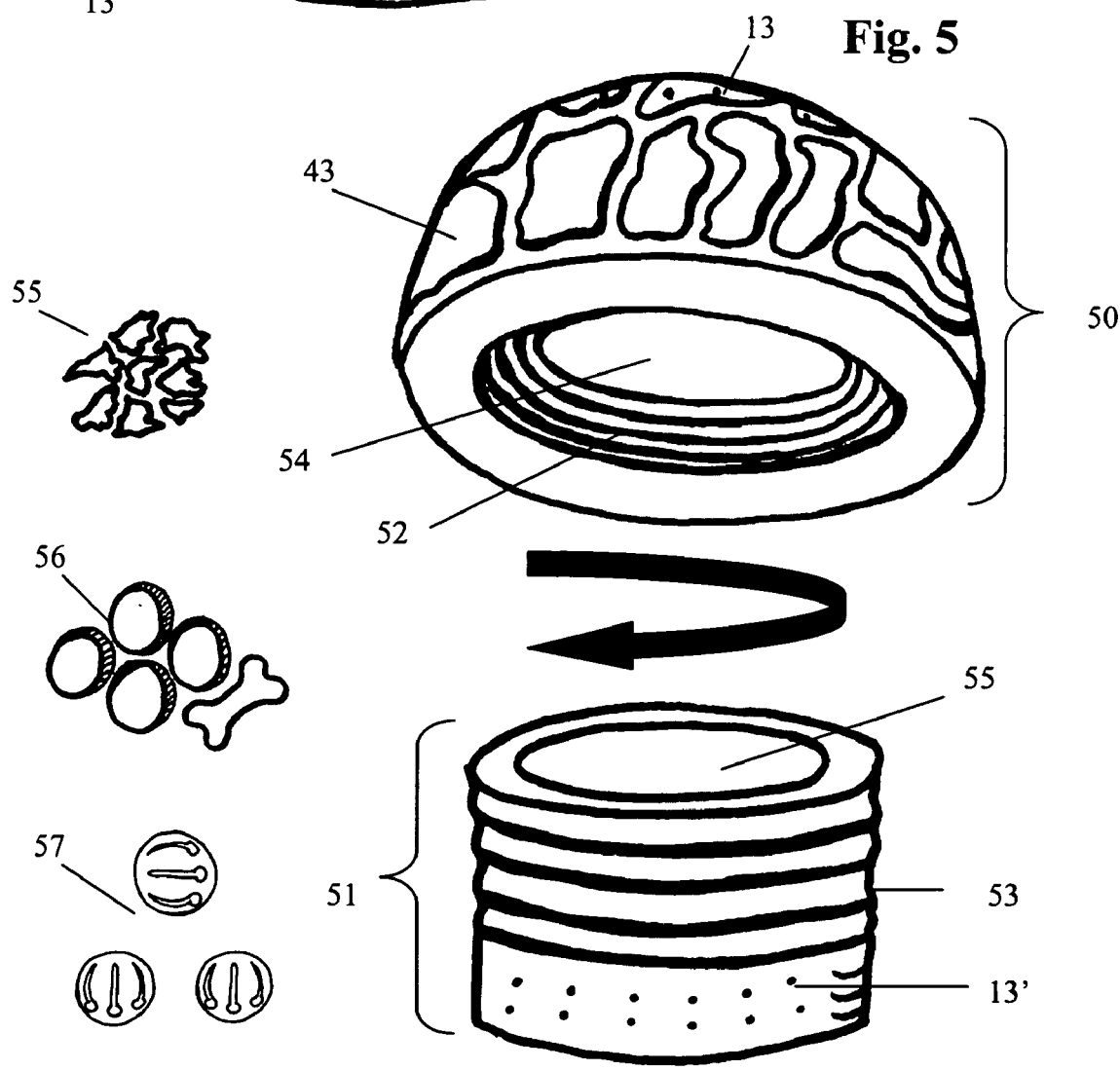
FIG. 5 shows both halves the alternate "Truffle" design of the toy with the lower half of the "Truffle" unscrewed from the upper half showing the hollow interior and some of its possible contents: animal enticements such as catnips, dog food treats, or bells.

FIG. 5 shows the "Truffle" embodiment taken apart, with the base 42 unscrewed from the upper half of the device 41. The interior of the upper half has threads 52 and exterior of the lower portion 42 has corresponding threads 53 to allow easy opening and closing of the device. The upper half 41 has a hollow interior 54. The lower half also has a hollow interior 55. Both can hold animal enticements such as catnip 55, dog food treats 56 or small bells 57.

Figure 6:
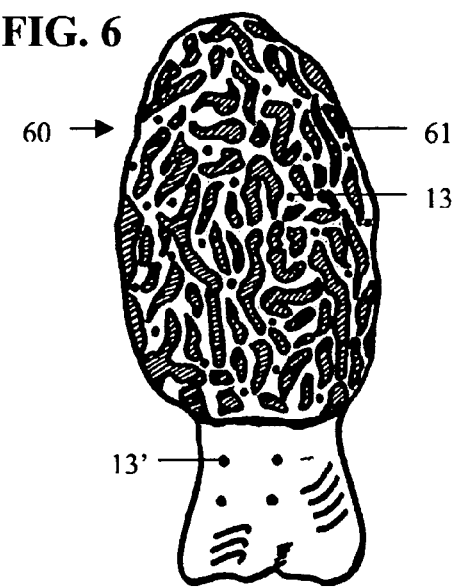
FIG. 6 shows a front view of the invention in another embodiment, a stylized version of *Morchella esculenta* (Morel).

FIGS. 6–10 show other embodiment of the invention, which are various stylized versions of mushrooms. FIG. 6 is a version of *Morchella esculenta* (Morel) 60 that has a plurality of small holes, or channels 13 in the upper and lower portions of the device 16 to allow scent emission. The surface of the upper portion of the device shows shallow, irregular depressions 61.

Figure 7:
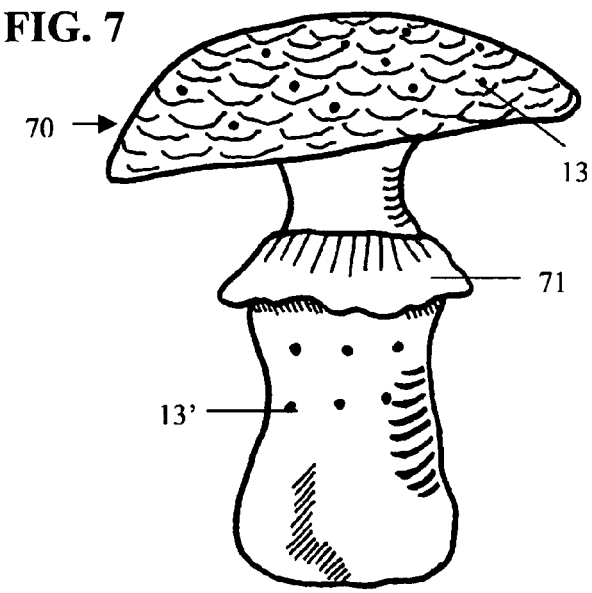
FIG. 7 shows a front view of the invention in another embodiment, a stylized version of *Agaricus augustus* (Prince).
Figure 8:
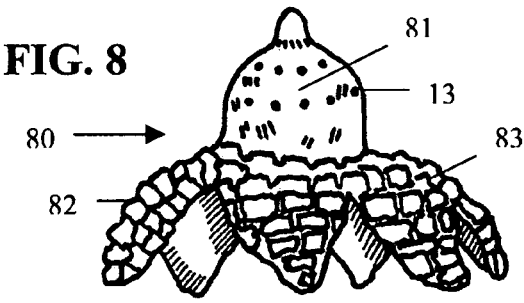
FIG. 8 shows a front view of the invention in yet another embodiment, a stylized version of *Geastrum pectinatum* (Earthstar).

FIG. 7 shows a stylized version of *Agaricus augustus* (Prince) 70 that has a plurality of small holes, or channels 13 in the upper and lower portions of the device that allow scent emission. A raised, skirt-like annulus 71 surrounds the essentially cylindrical lower portion of the device FIG. 8 shows a stylized version of *Geastrum pectinatum* (Earthstar) 80 that also has a plurality of small holes, or channels 13 in the upper rounded, hollow portion 81 of the device that allow scent emission. The six-part lower portion (legs) 82 is solid, with raised, irregular features 83 on each of the six legs, as shown.

Figure 9:
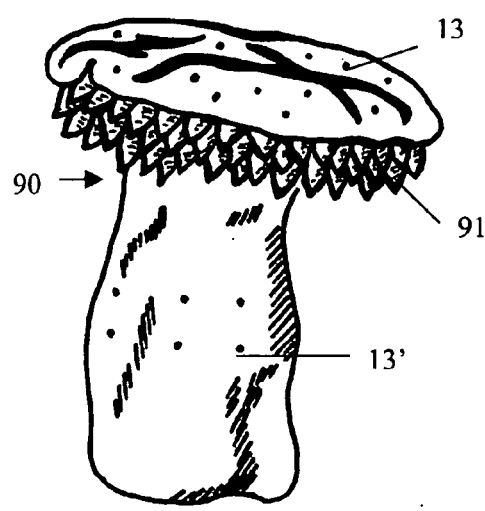
FIG. 9 shows a front view of the invention in another embodiment, a stylized version of *Dentinum repandum* (Hedgehog).

FIG. 9 shows a stylized version of *Dentinum repandum* (Hedgehog) 90 that also has a plurality of small holes, or channels 13 in the upper and lower portions of the device that allow emission. In this embodiment, cone shaped "teeth" 91 are featured on the lower surface of the upper portion of the device.

Figure 10:
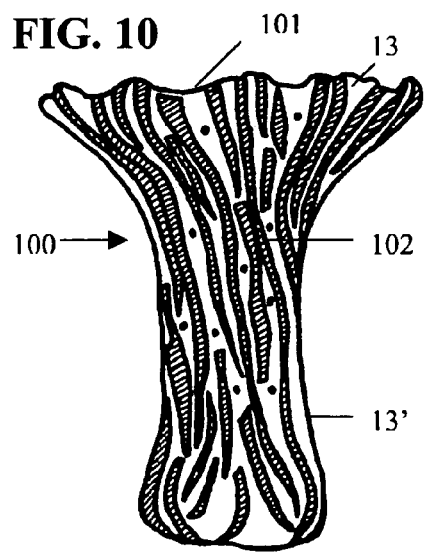
FIG. 10 shows a front view of the invention in another embodiment, a stylized version of *Cantharellus cibarius* (Chanterelle).

FIG. 10 shows a stylized version of *Cantharellus cibarius* (Chanterelle) 100 that also has a plurality of small holes, or channels 13 in the upper and lower portions of the device that allow scent emission. The upper portion is funnel-shaped with a depressed, concave, top-center surface 101. Deep, irregular groves 102 are positioned longitudinally along both the upper and lower portions of the device as shown.

One of the purposes of the invention is to provide a relatively simple and safe method for training one or more dogs to detect one or more target species of fungi using a toy as a training aid. The toy is used to train doges by first placing food treats in its hollow interior. During the second portion of the training process, dried mushroom, fresh mushroom or mushroom extract are used to provide the scent, which is to be detected by the canine. The method is comprised of the following steps First, the user places one or more toys in a training area in one or more predetermined locations. Then, the user introduces one or more dogs, responsive to a field command, into the training area. Next, the user instructs each of the dogs, separately or jointly, using a field command to locate the one or more toys and to then exhibit "keying" behavior such as sitting, digging, barking or laying down. During the training process, as the dog locates each of the devices that have been placed in the training area, it is desirable to provide the dog being trained a reward (e.g., a biscuit, a dog treat, additional physical attention, etc.) to further enforce the training progress and successes of the dog.

The term "command" includes field commands, trigger commands and all other oral, visual, auditory and/or physical signals which, when made by a canine handler to a dog responsive to such a command, will cause the dog to react as instructed in a controlled and conditioned manner. The term "field command" includes one or more commands such as, "sit", "speak", "dig", "come" etc., which, when made by a canine trainer to a dog responsive to such a command, will cause the dog to react as instructed in a controlled and conditioned manner. The term "trigger command" is defined to include any verbal or physical action performed by the trainer, which the dog has been trained to be responsive to, such as a field command of "find Cep".

Additionally, the trainer may use a "click-treat" method (Operant Training) where a dog is conditioned to act by clicks from the trainer and is rewarded with a treat instantly when the dogs promptly responds to the trainer's click(s).

A dog that has prior field experience and is able to respond to more than one field command is desirable and can be utilized in certain embodiments of the present method, e.g., a dog that will return when on or off lead, sit, stay and speak on command prior to learning this method is preferred. However, any dog having a desire to work in the field, having at least a minimal mental ability, mental desire, and a minimal physical ability, may be considered for use with the present invention.

Figure 11:
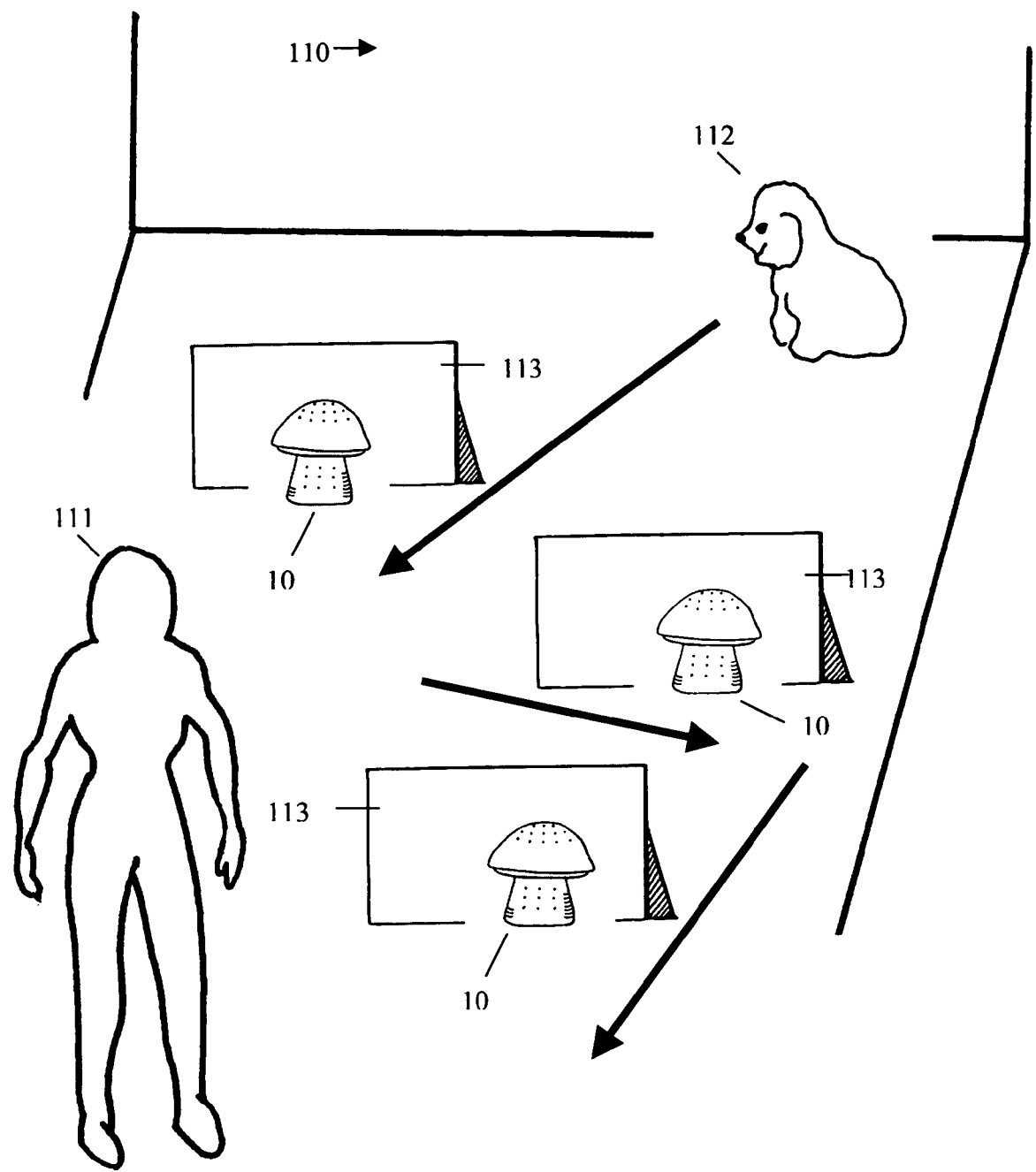
FIG. 11 shows a dog being trained to detect target fungi species using the invention.

FIG. 11 is an illustration of the preferred training method. Here, a dog 112 is being trained, off lead, in a training room 110 to detect target fungi species using the invention 10. The trainer 111 instructs the dog 112 to locate one or more of the devices 10, which are shielded from the dog's line of site with shields 113.

The first portion of the exercise includes training the dog to locate a mushroom-shaped chew toy resembling the desired target species, for instance a *Boletus edulis*, commonly known as "Cep". The scent of a food treat placed within the hollow core of the toy encourages the dog to move towards the device. The shape and size of the toy accustoms the canine to visual cues associated with the desired target species.

Initially, the device 10 is placed in visible locations and/or in proximity to one another to easily reinforce early successes that the dog is able to achieve. The use of several devices simultaneously is more effective and reduces time spent preparing a training area between practice sessions. As the canine approaches the device, the trainer praises and rewards the action. As discussed above, the click and treat method (Operant Training) of rewarding correct behavior is effective and recommended here. After the dog has displayed the desired behavior of moving toward the device, the triggering command "find Cep" is introduced and the dog is rewarded upon locating the device. Once the response to the trigger command "find Cep" is well established, further keying actions to alert the canine trainer of the presence of the mushroom-shaped chew toy are introduced. The field commands "sit" and "speak" can be introduced as keying behavior upon location of the device, presuming the canine is already conditioned to respond to these field commands.

When dog's skill in responding to the command "find Cep" has been reliably demonstrated the second portion of the training is implemented. Here, the food treat inside the mushroom-shaped chew toy is replaced with the scent of the fungal target species, for example fresh or dried Ceps or a Cep extract on a piece of sponge/foam/cotton fiber. The same level of complexity is maintained in practice sessions until the canine reliably locates the new scent of the target species. The mushroom-shaped chew toy is then placed in increasing non-visible locations (such as the behind the shields 113) or in actual field conditions and at greater distances from the canine and from other devices. The dog is clicked and rewarded, or verbally reinforced, when it responds to the trigger command such as "find Cep" and keys on the device by sitting and barking when the device is located.

If a subterranean species of fungi (e.g., truffles) is the desired target species, the above training method is expanded. Once the dog can locate the device on the surface of the soil, the "truffle" should be partially buried in slow stages until it is completely, but shallowly, buried. The dog is clicked and rewarded, or verbally reinforced, when it responds to the trigger command such as "find Truffle" and keys on the device by sitting and barking, or digging, when the device is located.

The final training component of the present invention is placement in the field of one, but preferably several, devices within close proximity to the actual wild fungal target species. The canine is then clicked and praised, or verbally reinforced, for locating and keying on the actual target species. The number of devices in a training area is reduced, and finally discontinued, as the dog locates actual target species fungi.

Initial training can commence indoors, hiding the devices in various places with decreasing visibility to the dog. For example, the device can be hidden under a box, blanket or in a dark room to increase the dog's reliance on its sense of smell to find the devices. Training can then proceed to a fenced outdoor locations for off lead training, and finally to actual field conditions with on or off lead training as the canine is reliably conditioned to the field commands and responds in a controlled manner to the trainer. During on lead training in field location sites, a six to twenty foot lead and a properly fitting harness are recommended. Once a canine recognizes a target fungal species consistently, the training method can begin again with a different target species.

By way of example without limitation, a Bichon Frise, having prior field training and having been trained to detect target fungi species, was introduced to a site having a number of wild fungi of the target species. Once introduced to the site, the Bichon Frise was then commanded by a trainer to locate the target fungi species, using a single or series of trigger commands. The Bichon Frise then searched for the desired fungi. Once the trainer confirmed species identification, the trainer then collected fungi located by the Bichon Frise.

While the exemplary embodiments of the present invention have been described with respect to training of dogs and the use of dogs to detect fungi species, including possible implementations with more than one dog at a time, the present invention is not so limited. The present invention may also be used to train other animals having olfactory sensory capabilities better than those of humans, such as those of a pig, cat, rat, and similar, and/or any other animal having a vomero-nasal area greater in size than that of a human. The present invention may also be used with two or more animals simultaneously, wherein, optionally, an untrained animal may be teamed with a trained animal and using the method herein, such untrained animal may have its training supplemented by the presence, movements and actions of the trained animal.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A pet chew toy, comprising:
   a) a body, having a size, a configuration, and being formed of a resilient material, the configuration of the body resembling a mushroom species;
   b) a means for holding a quantity of scent-emitting materials, being formed within said body and
   c) a means for communicating a scent, emitted from said scent-emitting materials, from said body into within having passages there through to place the scent emitting materials to the ambient atmosphere around said pet chew toy.

2. The pet chew toy of claim 1, wherein the means for holding a quantity of scent-emitting materials, being formed within said body is a hollow core formed in said body.

3. The pet chew toy of claim 1, wherein the body has a top portion having a generally hemispherical shape, and a bottom portion having a generally cylindrical shape.

4. The pet chew toy of claim 1, wherein the means for communicating a scent comprises a plurality of passages in said body, whereby said plurality of passages are in fluid communication with the ambient atmosphere and the means for holding a quantity of scent-emitting materials.

5. The pet chew toy of claim 3, wherein the generally cylindrical bottom portion further comprises:
   a) a plurality of threads formed in said generally cylindrical bottom portion; and
   b) a threaded cap, removably attached to said generally cylindrical bottom portion.

6. The pet chew toy of claim 3, wherein the generally cylindrical bottom portion further comprises:
   a) an opening formed in said generally cylindrical bottom portion; and
   b) a plug cap, frictionally in said opening formed in said generally cylindrical bottom portion.

7. The pet chew toy of claim 3 wherein the top portion of said body further comprises a plurality of threads formed thereon and further wherein the generally cylindrical shape of said bottom portion having a corresponding plurality of threads, such that said top portion and said bottom portion are screwably connected.

8. The pet chew toy of claim 1, wherein the scent emitting material emits a scent of a food treat.

9. The pet chew toy of claim 1, wherein the scent emitting material emits a scent of a fungus.

10. The pet chew toy of claim 9, wherein the scent is of a mushroom.

11. The pet chew toy of claim 10 wherein the mushroom scent is selected from the group of: *Boletus edulis* (Cep), *Morchella esculenta* (Morel), *Agaricus augustus* (Prince), *Armillaria ponderosa* (Matsutake), *Cantharellus cibarius* (Chanterelle), *Dentinum repandum* (Hedgehog), *Coprinus comatus* (Shaggy Mane), *Amanita caesarea* (Caesar's Amanita), *Pleurotus ostreatus* (Oyster), *Lactarius deliciosus* (Milkcap), *Lepista nuda* (Blewit), *Sparasis crispa* (Cauliflower), *Grifola frondosa* (Maitake), and Tuberales (Truffles).

12. The pet chew toy of claim 1, wherein the scent emitting material emits a scent of catnip.

13. The pet chew toy of claim 1, wherein the scent emitting material emits a valerian scent.

* * * * *